Jan. 22, 1963   I. H. POLK   3,074,247
METHODS AND APPARATUS FOR USE IN FREEZING PACKAGED PRODUCTS
Filed April 25, 1960
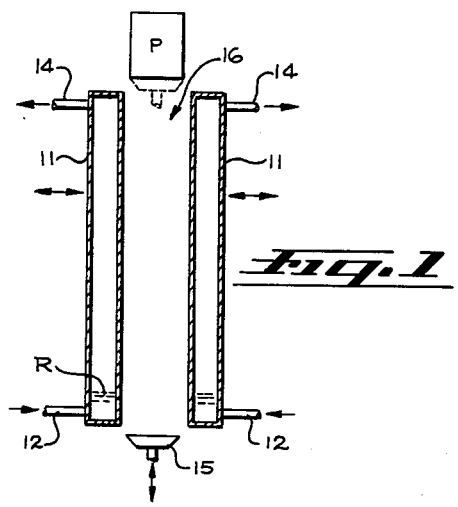
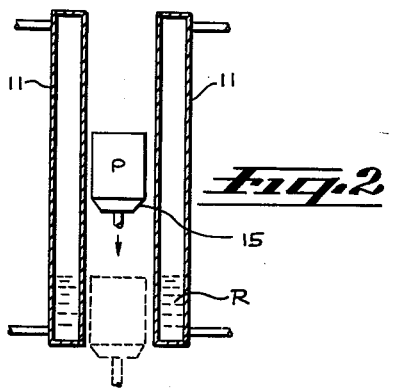
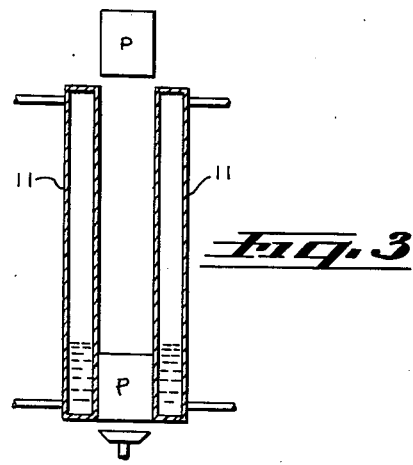
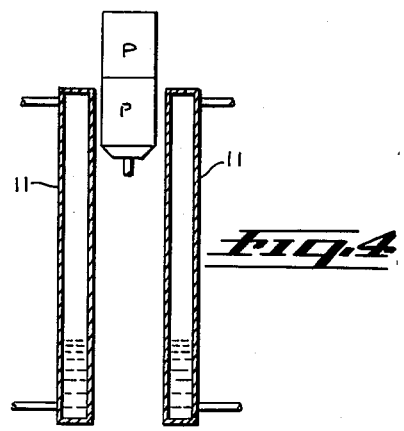
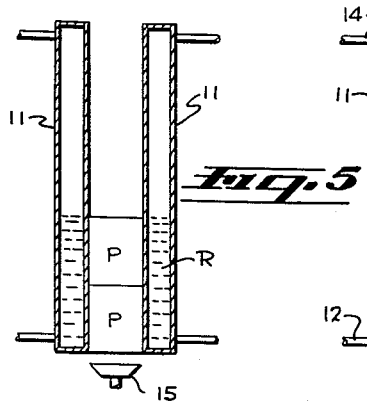
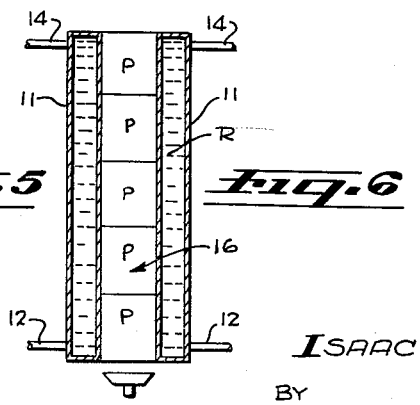
ISAAC H. POLK
INVENTOR
BY
Mason & Graham
ATTORNEY

United States Patent Office 3,074,247
Patented Jan. 22, 1963

3,074,247
METHODS AND APPARATUS FOR USE IN
FREEZING PACKAGED PRODUCTS
Isaac H. Polk, San Jose, Calif., assignor to The Texstar
Corporation, San Antonio, Tex., a corporation of Delaware
Filed Apr. 25, 1960, Ser. No. 24,603
5 Claims. (Cl. 62—63)

This invention has to do with methods and apparatus used in freezing packaged products between vertically disposed refrigerated metal plates wherein the packages are placed between the plates in horizontal rows with the apparatus operated in a manner such that, periodically, the lower row of packages containing frozen product is removed from between each pair of plates and a row of packages containing unfrozen product is added simultaneously at the top. Examples of such methods and apparatus are found in my United States Letters Patent Nos. 2,631,440 and 2,795,939.

With apparatus of the type in question wherein packages are periodically advanced from top to bottom of the plates, in the initial loading of the apparatus a single row of packages is first admitted between each adjacent pair of plates and positioned adjacent the lower margin thereof where the products are partially frozen for a period of time before the next row is added. Succeeding rows are introduced at periodic intervals and consequently a large portion of the surface area of the plates is left exposed to the atmosphere for a considerable time until the apparatus is completely filled with packages. This presents a serious frosting problem, because the apparatus is normally operated in ambient temperatures of a processing room. Therefore, an object of the invention is to overcome this problem and minimize or prevent the formation of frost or ice upon the exposed surface area of the plates during loading of the apparatus.

A similar problem exists in unloading the apparatus, since the rows of packages are periodically removed from the bottom of the plates with the result that an increasing amount of surface area of the plates becomes exposed to the atmosphere and subject to becoming frosted. It therefore is another object of my invention to provide a novel method for overcoming this.

These and other objects will be apparent from the drawing and the following description. Referring to the drawing, in which all of the views are diagrammatic in character:

FIG. 1 is a view in end elevation of apparatus for use in carrying out the invention and illustrating one step in the method; and FIGS. 2–6, inclusive, are views similar to FIG. 1 but showing various other steps in the method.

Referring to the drawing, I show a pair of hollow metal plates designated 11 which can be mounted in any suitable manner for limited lateral movement relative to each other in a direction toward and away from each other. The plates are adapted to be filled with liquid refrigerant R, such as ammonia, for example. Inlet pipes 12 and outlet pipes 14 are shown. An elevator 15 for raising and lowering rows of packages is shown below the plates in FIG. 1, and this may be mounted in any suitable manner for vertical movement between the plates. The plates may be of any practical size and economically can be several feet high and considerably longer.

As previously outlined, the packages, designated P, are normally advanced from top to bottom in the space between plates periodically with an unfrozen row being admitted at the top substantially simultaneously with the discharge of a frozen row or tier at the bottom. In initially loading the machine, the packages are admitted a row at a time with intervals therebetween corresponding to the normal intervals between the successive cycles of the apparatus in admitting and discharging rows of packages. Thus, initially a first row of packages, which temporarily can be supported above the space 16 between the plates in any suitable manner, is lowered into place opposite the lower margins of the plates by means of the elevator 15 which rises to engage the packages, as shown in broken lines in FIG. 1, and then lowers them, as shown in FIG. 2, to the broken-line position thereof. During these operations the plates are separated sufficiently so that the space therebetween is wider than the packages.

During the preceding operations and somewhat prior thereto, liquid refrigerant R is admitted to the plates at a metered or controlled rate of flow such that the level of refrigerant in the plates rises to about the height of the first tier of packages at about the time that the first tier is placed in position. The plates then remain in contact with the sides of the first tier of packages (FIG. 3) for a given period of time, namely, the cycling rate of the machine which would be the total time required to freeze the contents of a package divided by the number of rows of packages, after which the plates are moved away from the packages and a second row admitted, the elevator being used to raise the first row up to support the second row (FIG. 4) and then to lower both rows or tiers into position adjacent the bottom portions of the plates. The plates are then closed against the packages, as shown in FIG. 5. In the meantime refrigerant is admitted to the plates at a rate such that it has risen to approximately the top of the second tier of packages (FIG. 5).

Subsequently, periodically successive tiers of packages are admitted until the entire space 16 between the plates is filled, as shown in FIG. 6. During the time period of the admittance of tiers of packages periodically, the refrigerant is metered or supplied to the plates at a controlled rate so that the buildup of refrigerant in the plates is commensurate with the rise of the tiers of packages in the space between the plates. The flow of refrigerant cannot necessarily be at a constant rate, since the evaporation of the refrigerant will presumably take place at a greater rate as additional packages are added to result in increased heat transfer.

When the method is properly carried out there will be little or no frost accumulating upon the exposed areas of the plates above the tiers of packages during the relatively long time that there are exposed areas, since the refrigerant will be kept substantially at the level of the packages. The rapid heat transfer taking place due to the close engagement of the plates with the packages serves to prevent undue cooling of the plates above the area of the packages.

As previously pointed out, once the spaces between plates are completely filled with packages, the packages are admitted a row or tier at a time at the top and discharged a tier at a time at the bottom. In the unloading of the apparatus prior to shutting-down operations, the rows of packages are periodically removed from the space between plates thereby exposing the surface area of the plates above the uppermost row of packages. In order to prevent frost accumulation upon the exposed areas I lower the refrigerant level in the plates therein at a rate commensurate with the removal of the packages from the apparatus so that in general the liquid refrigerant is at no time higher than the top of the uppermost row of packages. Then when the last row of packages has been removed, the refrigerant has been substantially removed and the machine can be quickly shut down and there is no problem of wet plate surfaces.

Although I have illustrated and described preferred forms of my invention, I contemplate that various changes and modifications can be made therein without departing

I claim:

1. In the freezing of products within packages between vertically disposed hollow plates, placing a first row of said packages in said space between said plates adjacent the bottom margin thereof, introducing liquid refrigerant within said plates to an elevation approximately level with the height of said row of packages, partially freezing of the contents of said packages by the transfer of heat therefrom to said plates at said liquid level, and thereafter periodically repeating said operations by successively superposing other rows upon rows of said packages between said plates until said space is filled and the liquid refrigerant level in said plates has been correspondingly raised, whereby the formation of frost upon the exposed surface areas of said plates defining the space during loading is prevented.

2. The method of claim 1 with the step of periodically removing the lowermost row of packages from between said plates, whereby the rows superposed thereon are successively lowered a distance equal to the height of the removed row, and adding a row of unfrozen packages on said superposed rows to maintain the space between said plates filled.

3. The method of claim 2, and thereafter continuing said periodic operations by successively admitting a new unfrozen row of said packages at the top of said space as a frozen row of said packages is removed from the bottom of said space.

4. In the method of claim 1, successively removing rows of packages from the bottom of said space, and correspondingly withdrawing quantities of said liquid refrigerant from said plates to successively lower the level thereof a distance substantially equal to the height of the rows of packages remaining in said space.

5. In the method of claim 1, periodically moving said plates laterally outwardly for introduction of a row of said packages in said space between said plates, and then successively moving said plates laterally inwardly to engage said packages of the rows therebetween for the transfer of heat thereto.

References Cited in the file of this patent

UNITED STATES PATENTS

| | | |
|---|---|---|
| 1,924,225 | Yamane | Aug. 29, 1933 |
| 2,632,312 | Polk | Mar. 24, 1953 |
| 2,882,697 | Amerio et al. | Apr. 21, 1959 |
| 2,927,443 | Knowles | Mar. 8, 1960 |